Feb. 23, 1965   F. M. LINLEY, JR   3,170,337
SCREW AND NUT ASSEMBLY
Filed March 19, 1964
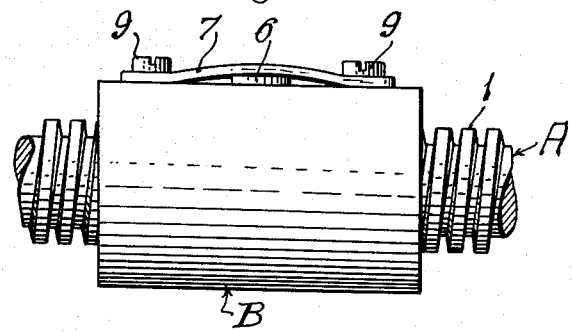
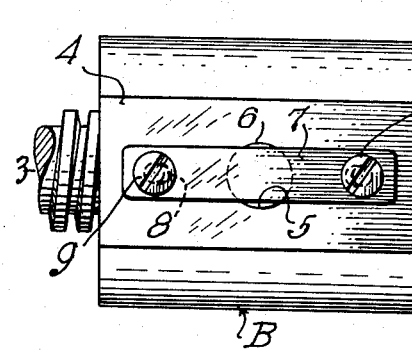
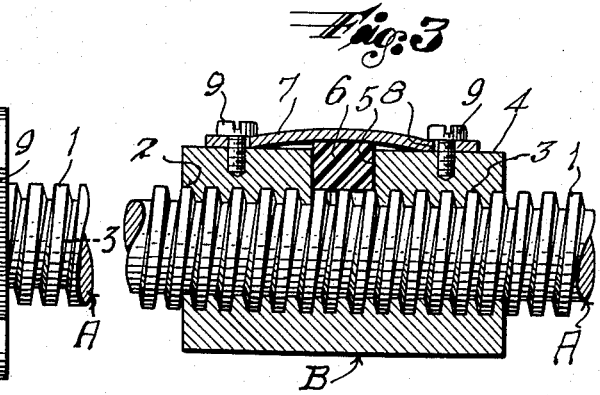
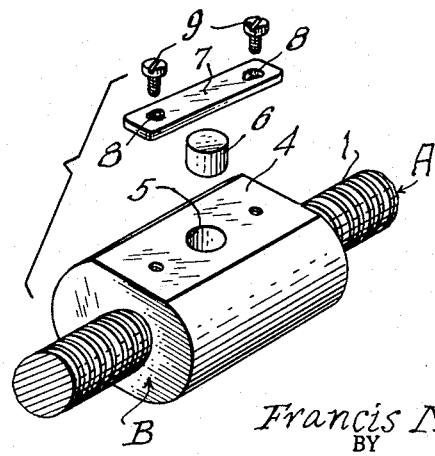
INVENTOR.
Francis M. Linley, Jr.
BY
ATTORNEY

United States Patent Office 3,170,337
Patented Feb. 23, 1965

3,170,337
SCREW AND NUT ASSEMBLY
Francis M. Linley, Jr., Fairfield, Conn., assignor to Montgomery & Company, Inc., Chatham, N.J., a corporation of New York
Filed Mar. 19, 1964, Ser. No. 353,034
7 Claims. (Cl. 74—424.8)

This invention relates to the fitting of the screw thread of a threaded nut to a mating threaded element such as a screw rod.

Due to the tolerance necessary for the effective mating of threaded elements, it has been normal practice to generate a screw thread to a high degree of tolerance on outside diameter or on inside diameter, depending on the particular configuration of the threaded element and on the thread pitch diameter. The threaded portion of a mating element was normally left in a dimensional condition which would require a relatively great mechanical effort to mate the parts. Positive fit and mating of the parts, so that one would traverse on the other with relative ease, is normally accomplished by placing a lapping compound consisting mainly of a fine abrasive material between the mated elements, and relatively rotating said elements in the presence of this lapping compound, until the mating elements gradually are configured, one to the other, to an acceptable degree, compatible with the intended use of the assembled and mated elements.

A primary object of the invention is to eliminate such selective mating of threaded elements by providing a novel and improved mechanical means for relatively and laterally moving the screw rod and the nut so that the pitch diameter of the screw rod is effectively held in firm yielding contact with the pitch diameter of the threaded portion of the nut, thereby to insure an accurate linear relationhsip of the mated parts on the pitch diameters of their respective threads, individually and collectively.

Another object of the invention is to provide a pressure block constantly yieldingly movable in the nut into relatively slidable contact with the crests of a predetermined number of threads of the screw rod at one side of the latter to constantly apply a mechanical force on the nut and the screw rod and thereby ensure constant, intimate sliding contact of the threaded portions of the screw rod and the nut that are located diametrically opposite the point of application of said mechanical force.

Other objects, advantages and results of the invention will be brought out by the following description in conjunction with the accompanying drawing in which:

FIGURE 1 is a side elevation of a threaded nut and screw assembly embodying the invention;

FIGURE 2 is a top plan view of the assembly;

FIGURE 3 is a central, vertical, longitudinal, sectional view approximately on the plane of the line 3—3 of FIGURE 2; and FIGURE 4 is an exploded perspective view of the parts of the assembly.

Specifically describing the illustrated embodiment of the invention the reference character A designates a threaded element, for example, a screw rod that has screw threads 1 of known form and on which is mounted a nut B having a longitudinal axial opening 2 therethrough which has screw threads 3 mating with the threads 1 of the screw rod.

The nut has a surface 4, which is shown as preferably but not necessarily, flat, on one side thereof, and a cylindrical opening 5 extends transversely of the nut from said surface into the opening 2 and perpendicularly or radially to the axis of said opening; and in said hole 5 is slidably mounted a cylindrical pressure block or pellet 6, preferably but not necessarily, formed of a synthetic plastic composition, for example "nylon," the outer end of which extends outwardly beyond surface 4 of the nut.

The inner end of the cylindrical block 6 is approximately flat and perpendicular to the axis of the block and contacts the crests of a predetermined number of convolutions of the screw threads 1, in the present instance three.

The block 6 is normally or constantly yieldingly pressed and held in contact with the threads by a suitable means, for example, a leaf spring 7 that bridges and contacts the outer end of the block and has a transverse slot 8 in each end thereof through which extends a fastening element such as screw 9 for securing the spring to the nut and at the same time permitting flexing the spring to cause it to exert yielding pressure on block 6 and yieldingly force and hold the inner end of the block in relatively sliding contact with the crests of the screw threads 1. With this construction the portions of the screw threads of the rod A opposite the point of application of mechanical force on the threads by the block 6, are constantly yieldingly forced into intimate contact with the corresponding portions of the threads 3 of the nut so that the intimate contact of the screw and nut on their respective screw thread pitch diameters is assured.

The radial pressure exerted by block 6 on the screw threads may vary according to the use requirements of the assembly, by proper selection of leaf spring pressure, size and design, as well as by proper choice of the diameter, length and type of material of the block 6. If desired, the tension of the spring 7 may be adjusted from time to time by proper adjustment of the screws 9, or the spring may be mounted and initially adjusted and thereafter made non-adjustable, although, of course, there always should be some freedom of movement of at least one end of the spring relative to the fastening element or screw and the nut B, for example, to compensate for wear of the block 6 and to maintain the desired intimate contact of the screw threads of the nut with the threads of the screw rod.

It will be understood by those skilled in the art that a nut and screw assembly of the general nature above described is useful for many purposes and is particularly useful and effective in, for example, measuring instruments and gauges wherein one part, for example a pointer or finger, is carried or moved by the nut upon rotation of the screw in another part such as a base or frame while the nut is held against rotation relatively to the base or frame, to ensure accurate and smooth movement of the nut.

Other uses and modifications in the structural details of the invention will occur to those skilled in the art as within the spirit and scope of the invention.

I claim:

1. For use with a screw, a nut having an axial opening formed with a continuous internal screw thread to mate with the thread of said screw, said nut being provided with a hole extending substantially radially through the side of the nut and through said internal thread, a block of material slidably mounted in said hole and extending into said axial opening of the nut to frictionally engage the crests of a plurality of convolutions of the thread of said screw when the nut is mated with the screw, and spring means normally biasing said block towards the axis of said opening and the internal screw thread to force the pitch diameters of the threads of the nut opposite said hole into yielding contact with the pitch diameters of the threads of the screw, the outer end of the block extending beyond the side of the nut, and said spring means including a leaf spring bridging and engaging the outer end of said block with its ends normally spaced from the block, and means at each end of the spring securing the spring to the block.

2. For use with a screw, a nut as defined in claim 1 wherein the inner end of said block is flat and parallel with the axis of said opening in the nut and said block is formed of resilient plastic material.

3. The combination of a continuous screw and a nut having an axial opening which a continuous screw thread mating with and screwed onto said screw, said nut being provided with a hole extending substantially radially through the side of the nut and into said screw-threaded opening, a block of material slidably mounted in said hole with its inner end flat and parallel to the axis of said screw threaded opening and frictionally engaging the crests of a plurality of convolutions of said screw, and spring means on said nut normally biasing said block toward and into contact with said screw, so that the pitch diameter of the screw will be held in firm yielding contact with the pitch diameter of the threaded portion of the nut, thereby ensuring accurate linear relationship of the mated parts on the pitch diameters of the respective threads.

4. The combination as defined in claim 3, wherein said hole is cylindrical, said block is cylindrical and has its inner end engaging said screw and its outer end extending outwardly beyond the side of the nut, and said spring means includes a leaf spring bridging and engaging the outer end of the block, and means at each end of the leaf spring securing the leaf spring to the block.

5. The combination as defined in claim 4 wherein said block is formed of resilient synthetic plastic material.

6. The combination as defined in claim 4 wherein the last-named means includes a headed screw loosely passing through an opening in each of said leaf spring and screwed into said block providing for adjustment of the tension of the spring by rotation of said screw.

7. For use with a screw, a nut as defined in claim 1 wherein the outer end of the block extends beyond the side of the nut, and said spring means includes a leaf spring bridging and engaging the outer end of the block, and means at each end of the leaf spring securing the leaf spring to the block, including a headed screw loosely passing through an opening in each end of said leaf spring and screwed into said block providing for adjustment of the tension of the spring by rotation of said screws.

References Cited by the Examiner

UNITED STATES PATENTS 2,430,458    11/47    Farrell.

DON A. WAITE, *Primary Examiner.*